United States Patent
Srivastava et al.

(10) Patent No.: US 9,123,027 B2
(45) Date of Patent: Sep. 1, 2015

(54) SOCIAL ENGINEERING PROTECTION APPLIANCE

(75) Inventors: Manoj Kumar Srivastava, Reston, VA (US); William Andrews Walker, Springfield, VA (US); Eric Alexander Olson, Alexandria, VA (US)

(73) Assignee: QINETIQ NORTH AMERICA, INC., McLean, VA (US)

( * ) Notice: Subject to any disclaimer, the term of this patent is extended or adjusted under 35 U.S.C. 154(b) by 6 days.

(21) Appl. No.: 12/907,721

(22) Filed: Oct. 19, 2010

(65) Prior Publication Data
US 2012/0096553 A1 Apr. 19, 2012

(51) Int. Cl.
| | |
|---|---|
| G06Q 10/10 | (2012.01) |
| G06F 21/56 | (2013.01) |
| H04L 12/58 | (2006.01) |
| H04L 29/06 | (2006.01) |
| G06F 15/16 | (2006.01) |
| G06F 21/00 | (2013.01) |

(52) U.S. Cl.
CPC .............. *G06Q 10/107* (2013.01); *G06F 21/56* (2013.01); *H04L 12/585* (2013.01); *H04L 12/588* (2013.01); *H04L 51/12* (2013.01); *H04L 51/32* (2013.01); *H04L 63/1425* (2013.01); *H04L 63/1441* (2013.01); *G06F 15/16* (2013.01); *G06F 21/00* (2013.01)

(58) Field of Classification Search
USPC ........................................... 726/24; 709/206
See application file for complete search history.

(56) References Cited

U.S. PATENT DOCUMENTS

| | | | |
|---|---|---|---|
| 2006/0069697 | A1* | 3/2006 | Shraim et al. ................. 707/102 |
| 2006/0101516 | A1* | 5/2006 | Sudaharan et al. ............. 726/23 |
| 2007/0079379 | A1* | 4/2007 | Sprosts et al. .................. 726/24 |
| 2010/0036946 | A1 | 2/2010 | Von Arx |
| 2010/0179961 | A1* | 7/2010 | Berry et al. .................... 707/769 |
| 2011/0185428 | A1* | 7/2011 | Sallam ............................ 726/24 |

FOREIGN PATENT DOCUMENTS

WO WO 2009/009859 A1 1/2009

OTHER PUBLICATIONS

International Search Report for PCT/US2010/038308, Sep. 24, 2010 (4 pages).

\* cited by examiner

*Primary Examiner* — Brandon Hoffman
*Assistant Examiner* — Samuel Ambaye
(74) *Attorney, Agent, or Firm* — Kenealy Vaidya LLP (57) ABSTRACT

Methods and systems for detecting social engineering attacks comprise: extracting one or more non-semantic data items from an incoming email; determining whether the one or more non-semantic data items match information stored in a data store of previously collected information; performing behavioral analysis on the one or more non-semantic data items; analyzing semantic data associated with the email to determine whether the non-semantic data matches one or more patterns associated with malicious emails; and based on the determining, performing, and analyzing, identifying the email as potentially malicious or non-malicious. The system also includes processes for collecting relevant information for storage within the data store and processes for harvesting information from detected social engineering attacks for entry into the data store and seeding of the collection processes.

20 Claims, 8 Drawing Sheets

SOCIAL ENGINEERING PROTECTION APPLIANCE

CROSS-REFERENCE TO RELATED APPLICATION

This application is related to co-pending U.S. patent application Ser. No. 12/813,961, entitled "Integrated Cyber Network Security System and Method," filed on Jun. 11, 2010, which is hereby incorporated by reference in its entirety.

TECHNICAL FIELD

The present disclosure relates generally to methods and systems for detecting and responding to social engineering attacks.

BACKGROUND

At the same time that email and other forms of Internet communications are becoming more ubiquitous, as more and more people depend on them for everyday personal and business purposes, the technologies used to implement these forms of communications are also advancing at an incredible speed in terms of their complexity and flexibility. As a result, a situation emerges in which a user-base is expanding, often with an ever increasing number of non-technically savvy new users, at the same time that the software used by such users is becoming more sophisticated. This increasing gap between users' technical familiarity with the tools they employ and the intricacies of those same tools presents hackers and other bad actors with the opportunity to exploit a large and unsuspecting user-base.

One common technique that hackers have used to exploit this gap is the social engineering attack. In a social engineering attack, a hacker seeks to extract information from a user by deceiving the user into believing that he or she is providing the information to or taking some action with respect to a trusted party. The social engineering attack thus differs from other hacking attacks in which a hacker may attempt to gain access to a computer or network purely through technological means or without the victim's assistance.

A "phishing" attempt is an example of a social engineering attack. In a phishing attempt, a hacker may send an email that poses as another party, such as a bank or other entity with which the user has an account. The phishing email may use company logos or information about the user to appear legitimate. The user is invited to "log in" or to provide other information to a fraudulent website that mimics a legitimate website, for example, by telling the user that he or she must reset his or her password. When the user logs into the fraudulent website, usually operated by the hacker, the hacker obtains the user's password or other information, which the hacker may then use to log into the user's actual account.

Another example of a social engineering attack is when a user is sent an email inviting the user to click on a link to access a webpage or download content that harbors malware. The term malware generally refers to any kind of program that is designed to perform operations that the owner or user of the computer on which the program resides would not approve of, and may include viruses, worms, trojan horses, spyware, or adware. For example, a user may be sent an email that purports to be from a person or an institution that the user knows. The email invites the user to download a song or movie by providing a link. However, the link may instead point to malware that, once downloaded and executed by the user, installs a trojan horse, virus, or other malware on the user's computer.

Traditional approaches to protecting users from social engineering attacks have tended to focus on analyzing the email itself for standard patterns and clues as to whether the email may be a social engineering attack. However, this approach is of limited value when the email either does not contain one or more of the standard patterns or may be recognized as malicious only by referencing external information associated with the email, which external information may be constantly changing or evolving. There is therefore a need for methods and systems that are able to evaluate emails using information external to the content of the emails themselves.

SUMMARY OF THE INVENTION

The present invention comprises methods and systems for analyzing incoming emails to determine whether they represent social engineering attacks. This analysis may comprise one or more of four distinct operations, including comparing information extracted from or associated with the email against a data store of previously collected information; performing behavioral analysis on the email; analyzing the email's semantic information for patterns suggestive of a social engineering attack; and forwarding the email to an analyst for manual review. One or more of these operations may also be performed in real-time or near real-time.

DETAILED DESCRIPTION

Figure 1:
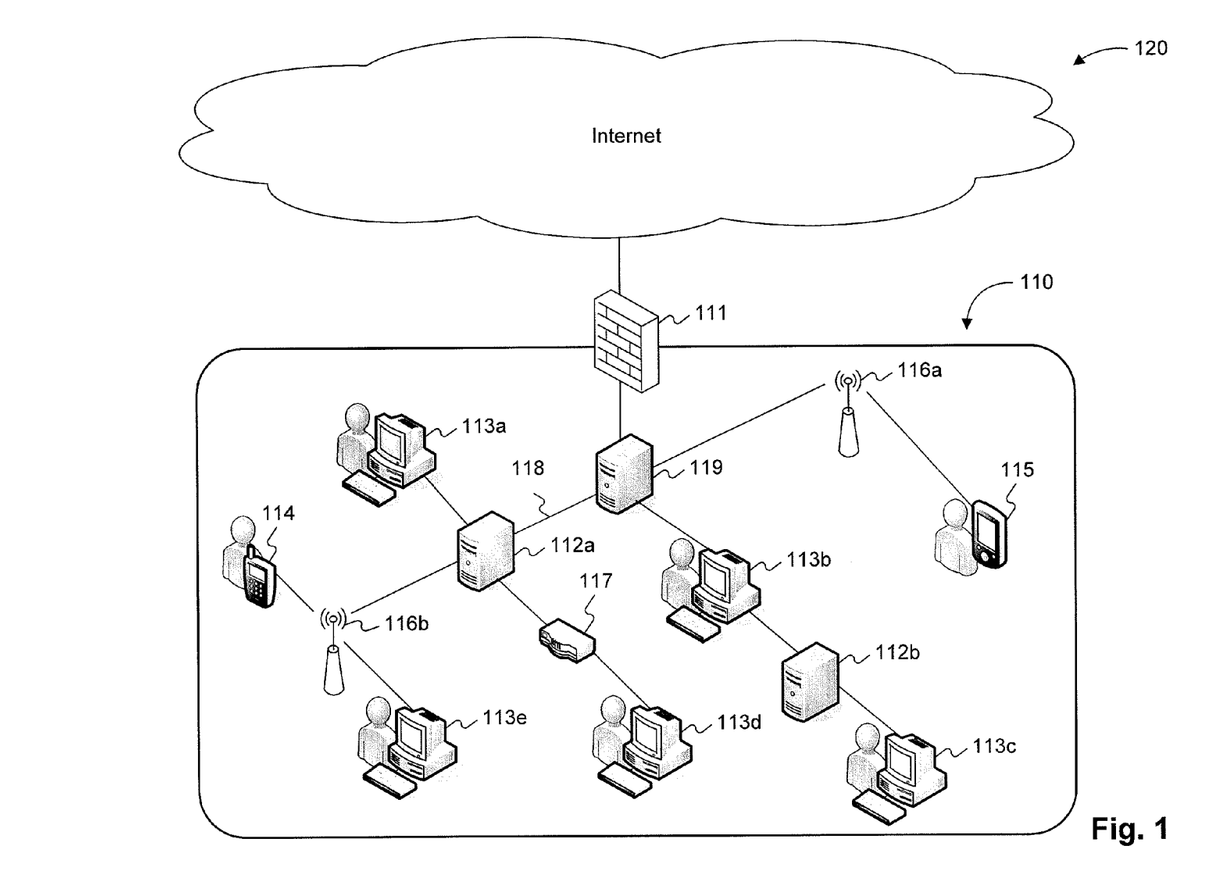
FIG. 1 is a diagram of an exemplary internal network interfacing with the Internet, consistent with certain disclosed embodiments.

FIG. 1 is a diagram of an exemplary internal network sought to be protected from cyber attacks, including social engineering attempts, consistent with certain disclosed embodiments. As shown in FIG. 1, network 110 may include one or more computers, e.g., user workstations 113a-113e; one or more internal servers, e.g., servers 112a-112b; one or more mobile devices, e.g., mobile phone 114 and/or personal digital assistant (PDA) 115. Each device in network 110 may be operatively connected with one or more other devices, such as by wired network cable, e.g., cat5 Ethernet cable 118; wireless transmission station, e.g., stations 116a-116b; network router, e.g., router 117, etc. It will be appreciated by those skilled in the art that many other types of electronic and analog devices may be included in network 110 or may be connected in different manners. It will also be appreciated by those skilled in the art that the devices resident in network 110 need not be physically collocated but may also be geographically spread across buildings, jurisdictional boundaries, and even foreign countries. Moreover, a given device may reside within multiple networks or may become part of a network only when certain programs or processes, such as a virtual private network, are operating. Communications between devices within network 110 and devices outside of the network, such as devices connected to the Internet 120, may first pass through or be subject to one or more security devices or applications, such as a proxy server 119 or firewall 111.

Figure 2:
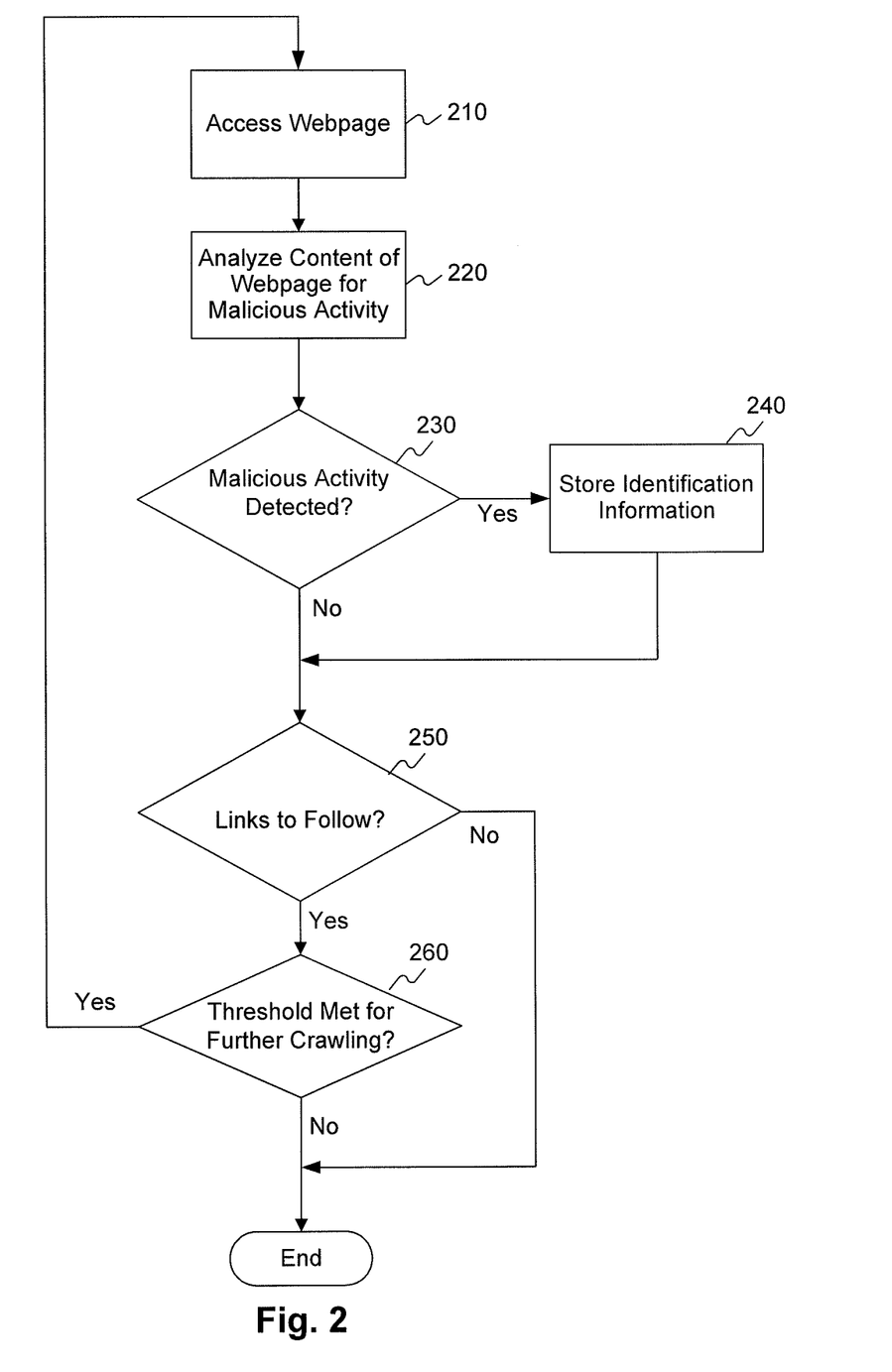
FIG. 2 is an exemplary flow diagram illustrating a method of collecting network information related to potential cyber threats, consistent with certain disclosed embodiments.
Figure 3:
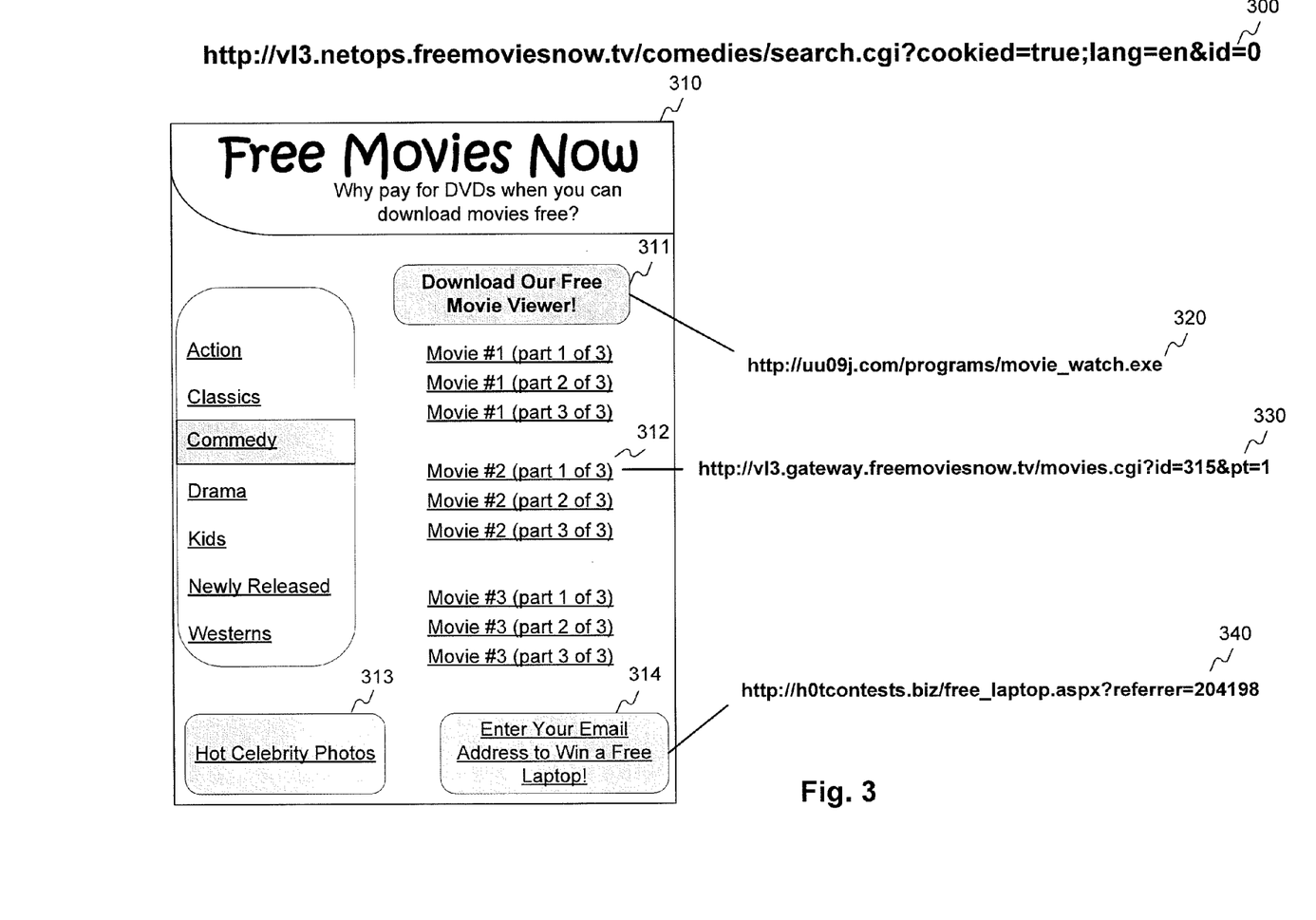
FIG. 3 is a diagram depicting an exemplary webpage, the content of which is analyzed by the collection process of FIG. 2, consistent with certain disclosed embodiments.
Figure 4A:
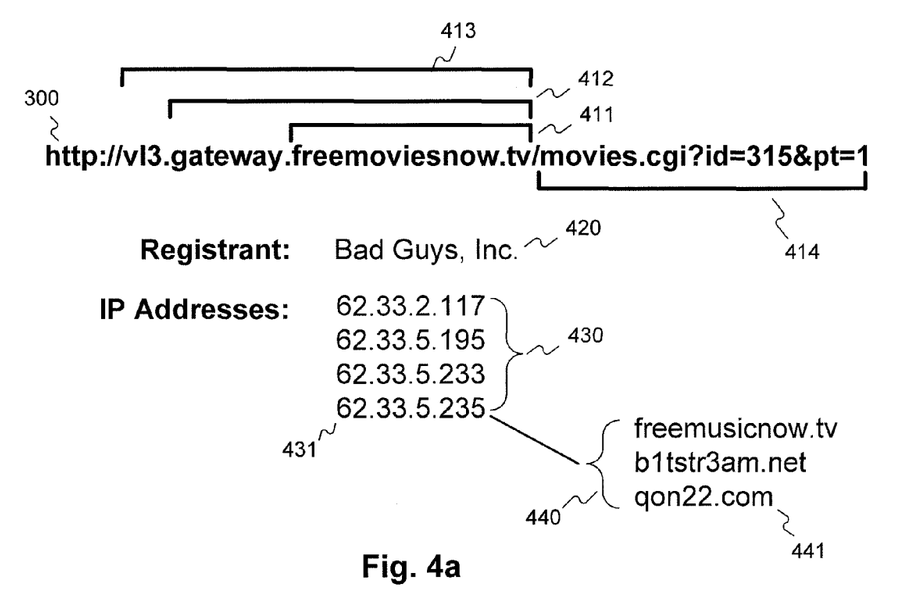
FIG. 4a is a diagram depicting sample information further collected based on the webpage of FIG. 3 by the process of FIG. 2, consistent with certain disclosed embodiments.
Figure 4B:
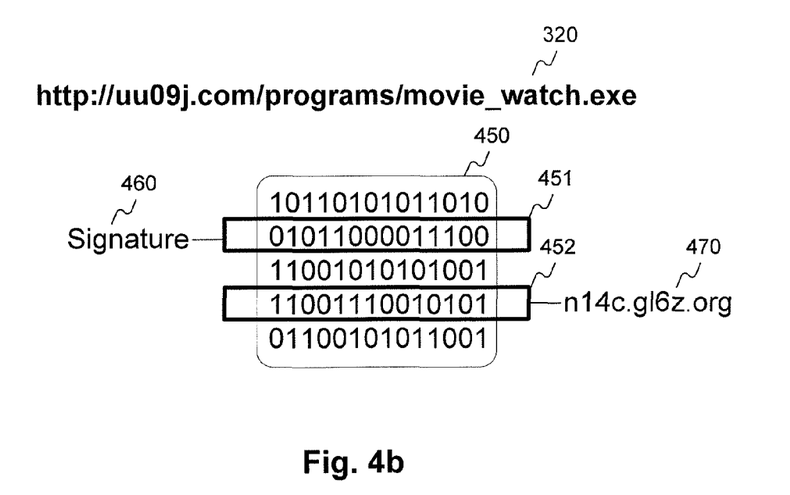
FIG. 4b is a diagram depicting sample information further collected based on the webpage of FIG. 3 by the process of FIG. 2, consistent with certain disclosed embodiments.

FIG. 2 is an exemplary flow diagram illustrating a process for performing routine collection of information associated with suspect activity, as further depicted in FIGS. 3 and 4, consistent with methods and systems of the present invention. In one exemplary embodiment, one or more processes continually execute, or are continually spawned, for crawling the Internet and/or other network infrastructures to collect information that may be entered into a database against which incoming emails may be scored to evaluate the likelihood that such emails are directed to social engineering attacks. In step 210, a collection process accesses an initial webpage, such as through a standard HTTP request, and downloads its content for analysis.

The collection process may select the initial webpage or website using a number of different techniques. For example, the system may possess existing information about the website, domain name, URL, IP address, or other information associated with the webpage that indicates that the webpage or website may be associated with malicious activity. Such information may include lists of websites, IP addresses, or registrants associated with known previous malicious activity, such as previous social engineering attempts, spamming, malware or virus distribution or hosting, participation in rogue DNS or DNS cache poising activity, denial-of-service attacks, port scanning, association with botnets or other command-and-control operations, etc. Such lists may also comprise websites that, although not primarily engaged in malicious activity, have nonetheless been compromised in the past and therefore may serve as a likely conduit, unsuspecting or otherwise, for malicious activity originating from otherwise unknown sources.

Alternatively, while the initial webpage or website may not have any known previous malicious activity, it may nevertheless fall within one or more categories of content that have been empirically shown to have a higher correlation with malicious activity, such as pornographic sites; sites distributing pirated content; hacking, cracking, or "warez" sites; gambling sites; sites that attempt to entice web surfers with suspect offers, such as answering questions to obtain free merchandise; etc. For example, as depicted in FIG. 3, the collection process may analyze the content of web page 310 associated with URL 300 on account of the suspect nature of its content—e.g., pirating of copyrighted movies.

As yet another alternative, the system may engage in random or routine web crawling, with the expectation that the vast majority of websites will ultimately be categorized as innocuous. In certain embodiments "crawling" may include downloading a webpage's content through HTTP request/response, JavaScript, AJAX, or other standard web operations; parsing the received content for IP addresses, URLs, or other links to other webpages, websites, or network devices; and then repeating the process for one or more links in a recursive manner.

In step 220, the downloaded webpage content is analyzed, either by the process that collected the data or by another process, such as a process devoted entirely to content analysis. The webpage content is analyzed for indications of potential malicious activity. As previously described, such malicious activity may include, for example, social engineering, spamming, malware distribution or hosting, botnet activity, spoofing, or any other type of activity that is illegal, generally prohibited, or generally regarded as suspect or disreputable. Detecting malicious or potentially malicious activity may be accomplished using a number of different techniques, such as identifying various red-flag keywords; detecting the presence of official logos, banners, or other brand indicia that may suggest the impersonation of an otherwise reputable company; downloading files from the website to determine whether they include malware or other viruses (such as through the use of signature strings); or other techniques.

For example, as depicted in FIG. 3, the collection process may download the HTML returned by making an HTTP "GET" request to URL 300, along with any embedded elements within the HTML, which, if displayed in a standard browser, would resemble web page 310. URL 300 may be selected on account of previously known information about the content hosted by that URL—for example, its pirating of copyright-protected movies—or it may be encountered randomly through routine web crawling operations. URL 300 may also be selected on account of its inclusion in data feeds, such as feeds identifying newly registered domain names or feeds disclosing known bad actors in cyberspace.

In the event that indicia of malicious activity are detected (step 230, Yes), the webpage or website is then processed to identify and collect various pieces of identification information or metadata (step 240). Such identification information may include the URL of the webpage and all information associated with the website of which the webpage is part. Identification information may be stored in a database or other data store.

For example, the content of web page 310 may be analyzed and determined to be associated with pirating activity. As a result, the system may catalog URL 300, along with various constituent parts of the URL 300, such as its second-level domain 411 and sub-domains 412 and 413. Additionally, using standard Domain Name Service (DNS) lookup operations, it may be determined that domains 411, 412, and/or 413 are hosted by various IP addresses, such as IP addresses 430. IP addresses 430 may additionally be subjected to geo-location investigation, which, in this example, would reveal that each IP address is hosted in Russia, a known hot spot for servers engaged in illegal cyber activity. The domains and/or IP addresses may be further queried to reveal one or more registrants, such as registrant 420. All such information comprises "identification information" about the webpage, which may be collected and stored in step 240. Many other pieces of identification information could also be gleaned from URL 300 and web page 310. Moreover, it is not necessary that the process that crawls the Internet and collects data be the same process that analyzes the collected data. In an alternative embodiment, the collection process may be devoted primarily to collecting data, which data is forwarded to other processes for analysis.

In step 250, the web page is further analyzed to obtain links to other web pages, websites, objects, domains, servers, or other resources to examine for potential malicious activity. "Links" may include, for example, hyperlinks, URLs, and any other information that may be used to identify additional data or items in a network for analysis. For example, in FIG. 4, the second-level domain 411 of URL 300 may be considered a "link" since it can be used to derive IP addresses 430 at which the second-level domain 411 is hosted, and registrant 420, the owner of domain 411. Registrant 420 is also a "link," since it may be analyzed to determine other IP addresses, domains, or websites owned by the registrant. For example, a reverse-DNS lookup may be performed on IP address 431, which may reveal that additional domains 440 are hosted at IP address 431, the same IP address that hosts domain 411. HTTP requests may then be made to each of domains 440 to determine whether such websites also contain malicious activity or information useful for crawling. Likewise, the range of IP addresses 430 may also be considered a "link," since it may be inferred that other IP addresses (not listed) falling within that range or associated with a similar geographical IP range may be suspect.

Likewise, web page 310 displays several hyperlinks 311-314, from which additional URLs 320, 330, and 340 may be gleaned. HTTP requests may be made to each such URL to analyze the content of each associated website. URL 320, in particular, links to an executable program file 450. Executable program file 450 may be downloaded and analyzed to determine whether it contains any malware or similar malicious characteristics. For example, comparing a part 451 of the executable file 450 with virus signature 460, it may be determined that executable file 450 harbors a virus or other form of malware. Based on such a determination, executable file 450 may be further analyzed for information that can be catalogued and used as links. For example, analysis of the binary information of executable file 450 may reveal a string 452 that references a domain name 470.

Since the foregoing process of identifying links could, in many cases, go on forever, the crawling process may need to make a threshold determination of whether to pursue any of the links gleaned from the webpage (step 260). In the event that the crawling process decides to pursue any of the links, each such link may then become the seed for conducting the entire analysis process all over again, beginning at step 210. In the event that the crawling process decides that it is not a valuable use of system resources to pursue any of the identified links—for example, if the analyzed web page were determined to be completely innocuous, or if it were the third innocuous web page in the recently traversed crawling chain (suggesting that the crawling process has reached a "dead end"), the crawling process may terminate the current chain. The crawling process may then communicate with other system processes to obtain new starting points or "seeds" for crawling.

Figure 5:
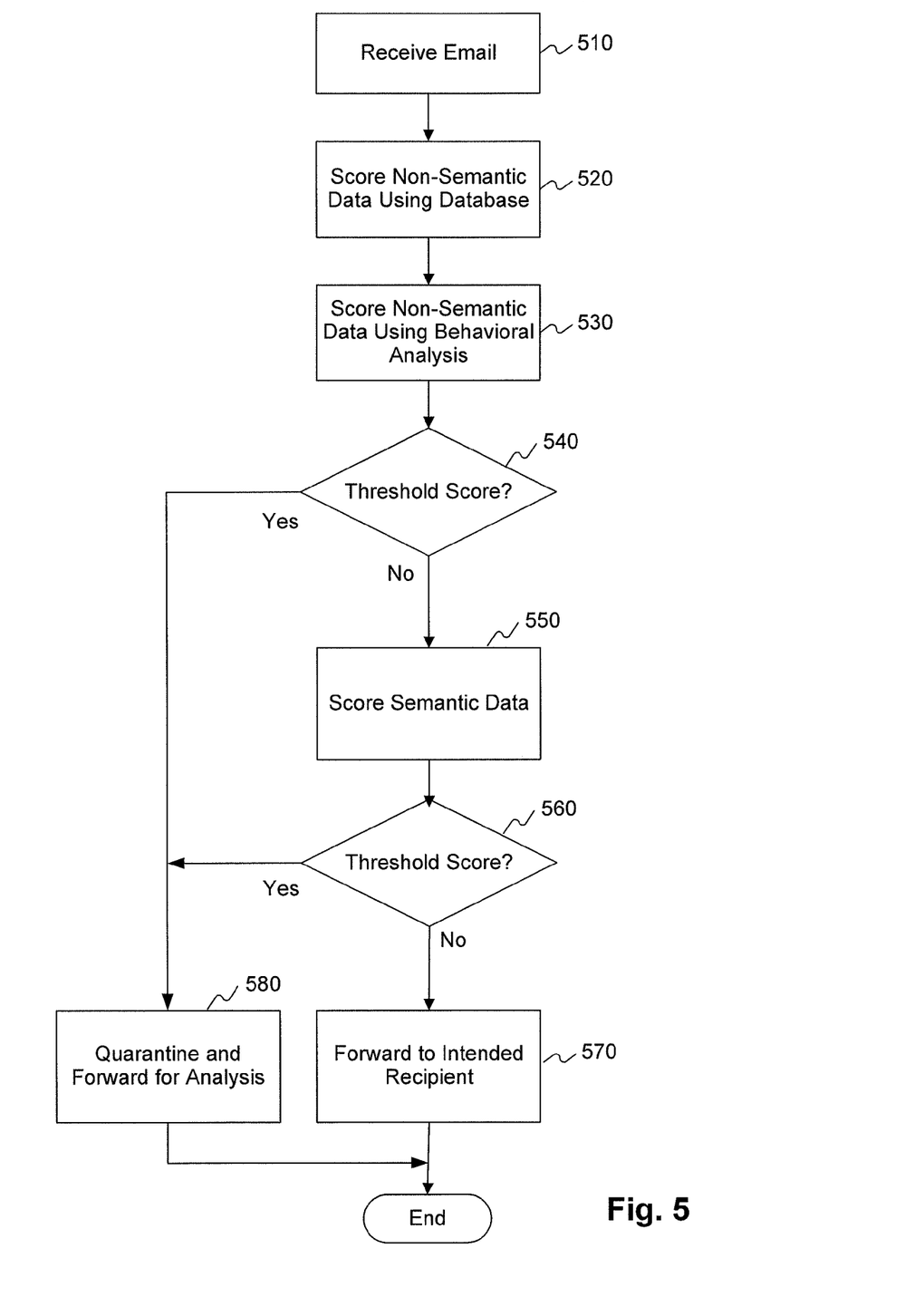
FIG. 5 is an exemplary flow diagram illustrating a method of analyzing an incoming email for evidence of a social engineering attack, consistent with certain disclosed embodiments.
Figure 6:
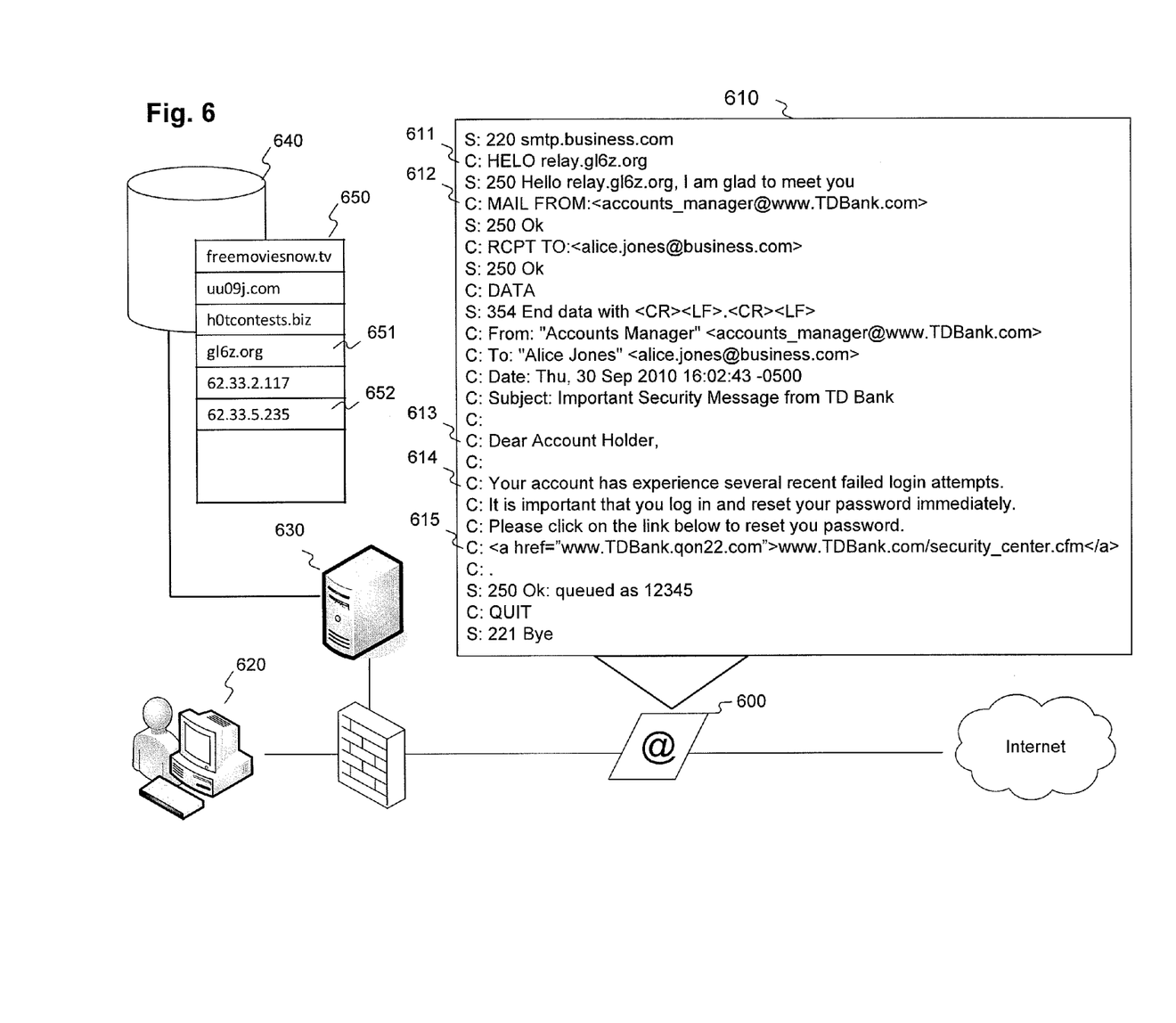
FIG. 6 is a diagram illustrating an exemplary email analyzed for evidence of a social engineering attack, consistent with certain disclosed embodiments.

As depicted in FIGS. 5 and 6, the information collected in FIGS. 2-4 may then be used to proactively identify and guard against social engineering attacks, such as "phishing" email attempts. The process may begin when an email 600, is sent from a computer outside of network 110 (not shown) to a user (or user device) 620 within network 110 (step 510). However, prior to arriving at user 620, email 600 may first have to pass through device 630. Device 630 may be, for example, a Simple Mail Transfer Protocol (SMTP) server tasked with the process of receiving incoming mail and storing such mail for access by user devices using protocols such as the Post Office Protocol-Version 3 (POP3) or Internet Mail Access Protocol (IMAP). Alternatively, device 630 may be a dedicated security device that interfaces with one or more SMTP servers to analyze emails received by the SMTP servers before they are ultimately forwarded to the intended recipients or made available for review through POP3 or IMAP.

Device 630 analyzes the content 610 of email 600 for both semantic and non-semantic data. In some embodiments, "non-semantic data" may be data that can be easily harvested from the content of an email and compared with identification information—for example, URLs, domain names, IP addresses, email addresses, etc.—to obtain accurate, objective comparisons or matches with previously archived identification information. "Semantic data" may refer to information contained in the email that cannot easily be compared with previously archived information, such as through simple string matching techniques, but instead must be analyzed to find patterns suggestive of a social engineering attack.

For example, one characteristic typical of phishing attempts is to include hyperlinks (using the HTML anchor tag) within the email text that appear to point to a trusted location, by placing a well known location in the text of the anchor tag, yet actually provide a different URL (pointing to an impostor site) in the anchor's target attribute. For example, as shown in FIG. 6, email 600 includes a hyperlink 615 in its content 610. Because of how anchor tags are displayed in HTML, the text "www.TDBank.com/security_center.cfm" is the URL that will ultimately be displayed when a user views email 600 in a browser or email client. However, because the anchor tag specifies the URL "www.TDBank.qon22.com" as its target, that is the location to which the user will ultimately be directed (likely a fraudulent website) if the user clicks on the displayed link. The user who is not technically savvy is thus deceived into believing that he or she is visiting the webpage "www.TDBank.com/security_center.cfm" after clicking on the link because that is the text that is displayed.

Therefore, device 630 may identify such URL mismatches and recognize email 600 as a potential phishing attack as a result. The component URLs of such a mismatch may be considered non-semantic information individually, since they could each be queried against a database 640 to determine whether they match URLs that have been previously identified as malicious. However, in the event that neither URL is recognized as malicious by itself, their malicious nature might only be discernible when evaluated in the overall context of how they are used—in this case, as part of an anchor tag whose text does not match its target. It is in that sense that such information is "semantic" and must be analyzed for internal or contextual patterns in order to understand its malicious nature. Semantic information may also comprise various keywords typically associated with social engineering attacks.

Returning to the example of FIGS. 5 and 6, in step 520, device 630 analyzes email 600 to score its non-semantic data against database 640. Device 630 first examines the content 610 of email 600 to extract any and all non-semantic data. As shown in FIG. 6, content 610 reflects the standard SMTP communications that may occur when an email is sent to an SMTP server. For purposes of illustration only, each line preceded with "S:" indicates a message sent from the SMTP server (e.g., device 630) to the SMTP client (not shown) that is attempting to send email 600. Likewise, each line preceded with "C:" indicates a message sent from the SMTP client to the SMTP server.

In some embodiments, the SMTP client will first attempt to initiate communication with the SMTP server by requesting a TCP connection with the SMTP server, specifying port number 25. In response, the SMTP server will respond with a status code of 220, which corresponds to a "Service ready" message in SMTP (i.e., that the SMTP server is ready to receive an email from the SMTP client). The SMTP client then identifies itself by issuing the "HELO" command and identifying its domain information. The foregoing back-and-forth communications between the SMTP client and SMTP servers are known as SMTP headers, which precede the body of the email to be transmitted. During this process, several other SMTP headers are transmitted that specify information such as the alleged sender of the email (here "accounts_manager@www.TDBank.com") and the intended email recipient (here "alice.jones@business.com"). It is important to note at this point that the actual sender of the email may specify any email address as the alleged sender of the email regardless of whether such an address is accurate or not. When an emailer purposely provides a false sender email address in the SMTP header for the purpose of making it appear that the email has come from a different person, such a technique is known as email "spoofing."

Once the SMTP headers have been exchanged, the SMTP client alerts the SMTP server that all following data represents the body of the email using the "DATA" command. Thereafter, each line of text transmitted by the SMTP client goes unanswered by the SMTP server until the SMTP provides a textual marker that indicates that it has completed transmitting the email body, for example using a single period mark flanked by carriage returns and line feeds.

Characteristics of SMTP—for example, the exchange of SMTP headers prior to the transmission of the email body—support real-time, in-line interception of social engineering attacks. That is, although some information in the SMTP headers may be spoofed, other identification information must be accurate in order for the SMTP client to successfully send the email. Because identification information such as domain names and IP addresses may first be obtained from the SMTP client, the SMTP server (e.g., device 630) may perform initial analysis on such identification information before accepting the remaining email body data. For example, device 630 may query the identified domain name, or its corresponding IP addresses, against a database 640 of previously archived malicious domain names and IP addresses. Alternatively, device 630 may perform real-time investigation of content hosted at the identified domain name or IP address (if such information is not already archived) to determine whether they point to websites that are malicious in nature. This characteristic of SMTP thus presents security advantages over other communication protocols in the OSI Application Layer, such as HTTP, which receives both message headers and body from the client in one operation, without substantive server-client message exchanges that precede the transmission of the message body. However, those skilled in the art will appreciate that the present invention is not limited to analyzing emails sent using SMTP, but may also be applied to emails and similar forms of network communication using other protocols, such as Microsoft's Exchange protocol.

Thus, using email 600 as an example, in step 520, device 630 extracts non-semantic data, e.g., data 611 ("relay.g16z.org") and 612 ("accounts_manager@www.TDBank.com") from the SMTP headers of content 610. Security device 630 may also elect to receive the body of email 600 in order to further glean any non-semantic data therefrom as well, such as the URLs in line 615. Also, although not shown, the IP address of the SMTP client that initiated the opening TCP connection may also be gleaned as non-semantic data. Such data is then queried against database 640 to see whether there are any previous records in database 640 that identify such URLs, domain names, IP addresses, or email addresses as malicious or suspect. In the example of FIG. 6, it can be seen that the domain name "g16z.org" is already stored as a record 651 in a database table 650 of malicious or suspect domain names and IP addresses.

Records in database 640 may be created using the crawling and collection process described with respect to FIGS. 2-4. Thus, it can be seen that each visible record in database table 650 corresponds to information collected after analyzing URL 300 and several links therefrom. In particular, the domain name "g16z.org," which is found in email 600, was originally identified and entered into database 640 after malicious executable program file 450 was downloaded from URL 320 and its binary data was analyzed to extract domain and URL strings.

Database 640 may additionally or alternatively be populated using data from government, proprietary, or other available feeds detailing cyber threat and/or other security information, such as various whitelists, blacklists, or reputational data. For example, database 640 may include data that may be used to positively identify an email as benign (rather than to identify it as malicious) using whitelist information, such as reputational classifications for known domain names or IP addresses. For purposes of this invention, it should be understood that database 640 may be populated in any manner to achieve a readily accessible and searchable archive of information that may be used to analyze incoming information, preferably in real-time, for the purpose of detecting and evaluating potential threats.

In the event that one or more non-semantic data items match data stored in database 640, email 600 may be flagged as potentially suspect. Alternatively, in order to provide a more nuanced approach to detecting cyber threats and to avoid a disproportionate number of false positives, the nature and number of matches may be quantified into a numerical or other type of score that indicates the likelihood that the email represents a social engineering or other form of attack.

In the event that the extracted non-semantic data items do not match any, or a sufficient amount of, data stored in database 640, real-time behavioral analysis may be performed to analyze the non-semantic data items (step 530). "Behavioral analysis" may include analyzing non-semantic data using information or resources other than those that have previously been compiled. For example, in one embodiment, device 630 may perform behavioral analysis on extracted data items, such as domain names, by launching a virtual browser to connect to servers hosting such domain names to determine whether they host websites that are malicious in nature (e.g., constructed to fraudulently pose as other, legitimate websites). In certain embodiments, "behavioral analysis" may encompass any type of analysis similar to that which would be performed on URLs, domain names, IP addresses, or similar links during the crawling and collection operations described with respect to FIGS. 2-4.

Thus, for example, since the domain name "www.TDBank.qon22.com" does not match any record in table 650, a reverse-DNS lookup is performed on the domain name "qon22.com," which reveals an IP address of 62.33.5.235 (operations not depicted). Since the IP address 62.35.5.235 does match record 652 in table 650, real-time behavioral analysis has revealed the suspect nature of the domain name "qon22.com" even though no information was previously stored about that domain name. If the resulting IP address had not matched, behavioral analysis may have comprised making an HTTP request to "www.TDBank.qon22.com" and analyzing the HTML or other content returned.

After analyzing all non-semantic data, for example by querying against database 640 and by using behavioral analysis, one or more numerical or other kinds of scores may be generated to determine whether a sufficient threshold has been met to consider the email malicious in nature (step 540).

If the email's non-semantic score meets or exceeds a threshold score, the email may be flagged as potentially suspect, quarantined, and forwarded for analysis (step 580). If the email's non-semantic score does not meet the threshold score, semantic analysis may then be performed on the email (step 550). For example, at least four semantic cues may be found in content 610 to indicate that email 600 may be fraudulent. First, as described above, the mismatch between the URL specified by the target of anchor tag 615 and the URL text anchored by the tag may indicate an attempt to deceive the user as to the target of the displayed hyperlink.

Second, the URL "www.TDBank.qon22.com" itself may provide a semantic cue. In the Domain Name System, only the second level domain name (i.e., the name preceding the generic top-level domain, such as ".com," ".edu," or ".org") must be registered. However, the domain name owner is then free to specify any number of additional sub-domains to precede the second-level domain in a URL. Thus, while there may be only one "TDBank.com," any other domain may use the text "TDBank" as a sub-domain name without the authorization or knowledge of the owner of "TDBank.com." In this example, the sender of email 600 has used the well-known text "TDBank" as a sub-domain of the otherwise unknown "qon22.com" domain name. Because unwary users might confuse "www.TDBank.qon22.com" with a website under the "TDBank.com" second-level domain (e.g., "www.qon22.TDBank.com" or "www.TDBank.com/qon22"), the use of a well known domain name as a sub-domain name may therefore be a semantic indication of potential fraud.

Third, the use of the generic salutation "Dear Account Holder" in line 613 may additionally signal a potential social engineering attack, since legitimate websites and other institutions will typically include some type of private user account information, such as a username, surname, or account number to demonstrate their authenticity. Finally, the occurrence of spelling or other grammatical mistakes 614 may also indicate potential fraudulent status.

Such semantic patterns may also be quantified and combined to produce a numerical or other type of score. If the email still does not meet a particular threshold score (step 560), the email may be regarded as non-malicious and may be forwarded to its intended recipient (step 570).

In one embodiment, if an email has been flagged as suspect or malicious, the email is then forwarded for analyst review. For example, the email may be forwarded to a human operator who may further analyze the email to determine whether it was correctly flagged as malicious (i.e., to rectify false positives). Preferably, analyst review is conducted using an interactive electronic system in which an analyst may be presented with various emails, or excerpts of emails, and prompted for input about the emails, such as the analyst's opinion about the legitimacy of the emails. The analyst may additionally have at his or her disposal a browser, telnet client, or other kind of communications program for performing additional investigation as to the legitimacy of the email.

Figure 7:
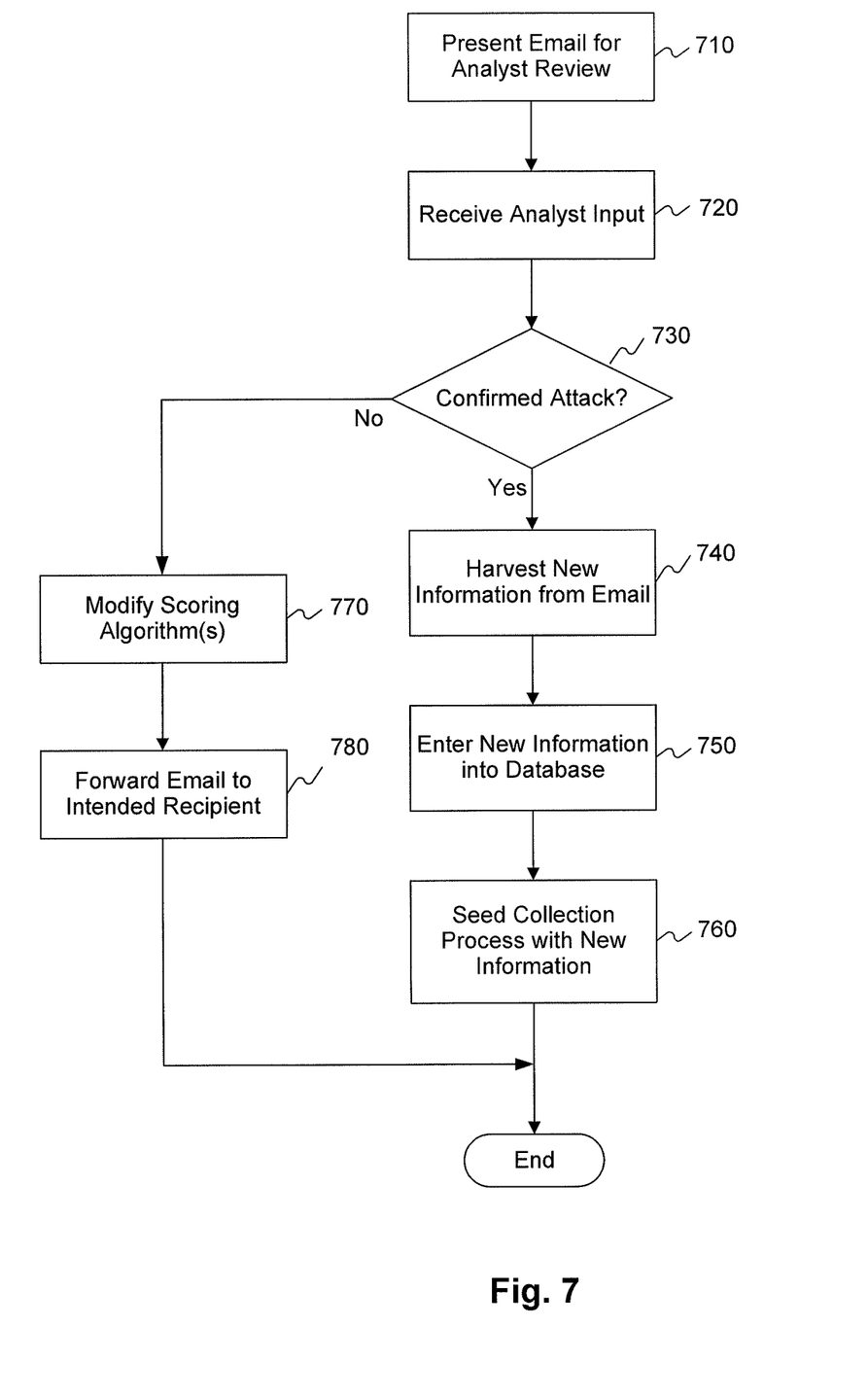
FIG. 7 is an exemplary flow diagram illustrating a method of analyzing an email flagged as a potential social engineering attack, consistent with certain disclosed embodiments.

Referring now to FIG. 7, in step 710, an email that was flagged as potentially malicious may be presented to an analyst for review. After reviewing the email, the analyst provides his or her input about the email (step 720). Although such input may typically be the analyst's opinion as to whether the email was correctly flagged as fraudulent by the automated algorithms of FIG. 5, the analyst may further provide any other kind of input that might require human review or otherwise relate to assessments that could not be made by automated processes.

In the event that the analyst confirms that the email is a social engineering attack or other form of malicious email (step 730), the email may be then be further analyzed for identification or other information for use in either identifying the perpetrator of the email or identifying other potential threats (step 740). For example, a WHOIS inquiry may be made with respect to the domain information in item 611 to identify the registrant of the domain or the geographic location of the IP address that hosts the domain. Such information may also be entered into database 640 to be used to identify further social engineering attempts that include one or more pieces of the same information (step 750). Moreover, such information may be used to seed the collection process described with respect to FIGS. 2-4 to collect additional threat information to be entered into database 640 (step 760).

In the event that the analyst identifies a false positive, the email may be fed back into one or more automated processes (either with or without analyst input into reasons for the false positive) and one or more scoring algorithms may be modified so as to not erroneously flag emails as malicious based on the same reasons for the current false positive—i.e., to further machine learning and optimization of scoring processes (step 770). Finally, the email may be forwarded to the intended recipient (step 780).

Figure 8:
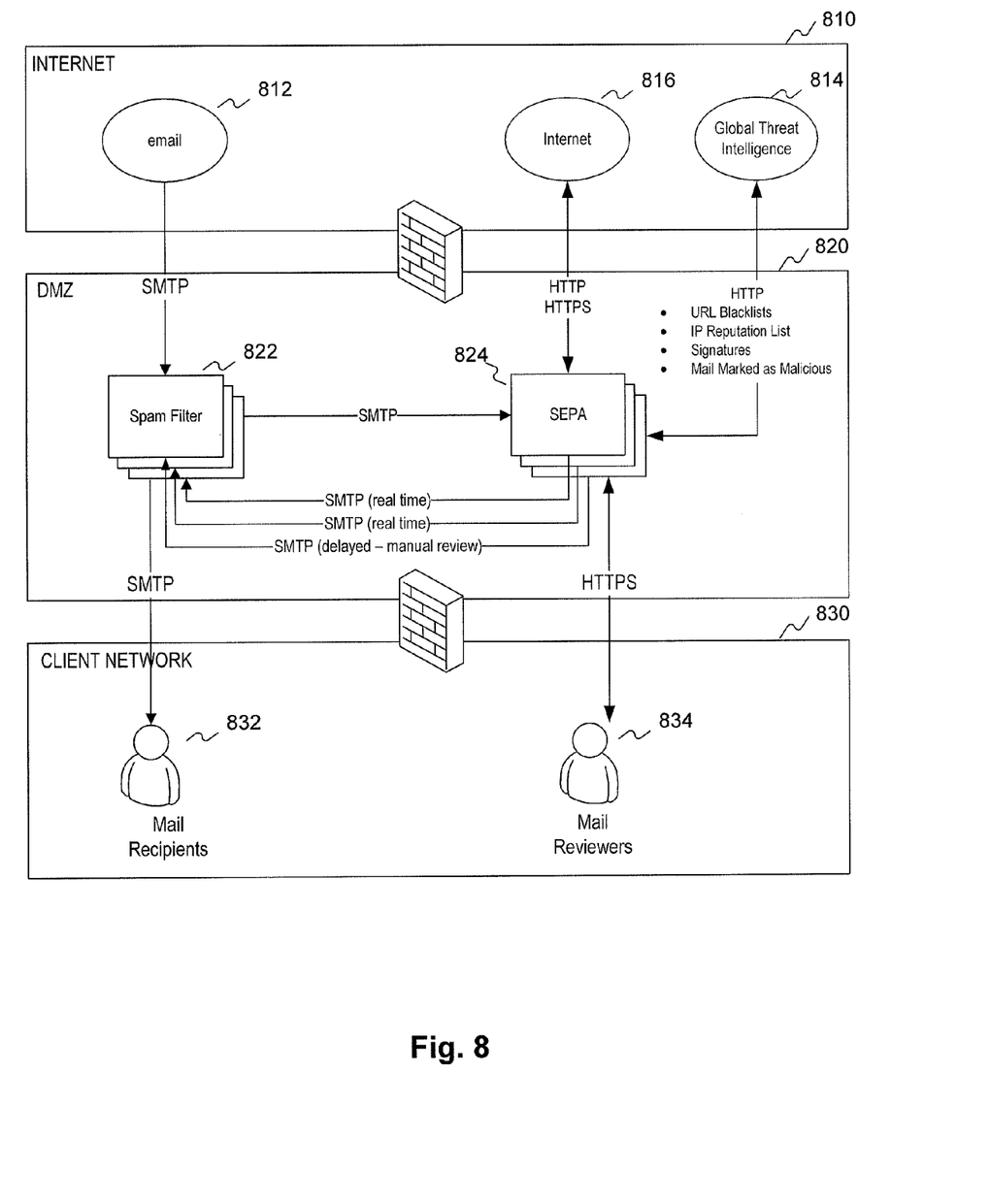
FIG. 8 is a diagram depicting an exemplary system for implementing methods consistent with certain disclosed embodiments.

FIG. 8 is a diagram depicting an exemplary system for implementing methods consistent with certain disclosed embodiments. In the system of FIG. 8, an email 812 intended for recipient 832 within client network 830 is sent from a device (not shown) within the Internet 810. However, prior to entering client network 830, email 812 must first pass through one or more security devices 822 within a security layer 820, for example, a device that is specially configured to detect and quarantine spam. After determining whether email 812 is spam, security device 822 may forward email 812 to a separate security device 824 (e.g., via SMTP).

An important aspect of this invention is that security device 824 may employ one or more of four distinct operations to determine whether email 812 may be a social engineering attack. First (although the order of these operations is flexible), security device 824 may extract various pieces of information, such as non-semantic and identification information, from email 812 to determine whether the email may be malicious by querying information associated with the email against a database of previously collected security information. Such security information may be collected by various web-crawling and investigative processes, such as those described with respect to FIGS. 2-4, and may be provided, for example, by one or more systems 814. Alternatively or additionally, system 814 may provide data collected from other proprietary or governmental sources, such as URL blacklists, IP reputation lists, or virus, malware, or other signature strings. Security device 824 and system 814 may be operatively coupled or may communicate via a communications protocol such as HTTP that allows security device 824 and system 814 to be separately geographically located.

Second, security device 824 may additionally perform real-time behavioral analysis by communicating with other devices connected to the Internet 816 that are referenced by or related to email 812. For example, security device 824 may make HTTP requests to websites using URL, domain, or IP address information associated with email 812. Security device 824 may analyze content received from devices 816, such as to determine whether websites hosted by devices 816 are fraudulent in nature, host malware, or link to other malicious websites.

Third, security device 824 may analyze the semantic content of email 812 to determine whether it matches any patterns associated with social engineering attacks. Security device 824 may perform this operation alone, may also utilize system 814, or may delegate the task entirely to system 814.

Fourth, security device 824 may forward email 812 to one or more analysts, such as mail reviewers 834 within client network 830 for manual analysis. Mail reviewers 834 may review email 812 to determine whether it was correctly flagged as malicious or incorrectly flagged as innocuous. In addition, mail reviewers 834 may perform additional analysis on email 812 in the event that they determine it to be malicious, such as collecting additional information for analysis or investigation.

In the event that email 812 is not deemed malicious by one or more of the above four processes, it is forwarded to its intended recipient 832. Important for purposes of this invention is that the system of FIG. 8 is able to analyze email 812 in real-time and within the flow of the email, such that the email may be received by device 822, analyzed by security device 824, and, if deemed to be innocuous, forwarded to its intended recipient 832 without introducing significant delays that would be observable by users as distinct from the normal delays associated with receiving emails from outside of network 830 (although delays could be introduced in the event that manual review is necessitated).

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. A computer-implemented method of analyzing incoming emails, the method comprising:
   extracting one or more non-semantic data items from an incoming email;
   determining whether one or more of the non-semantic data items match previously collected malicious activity information stored in a data store;
   if the non-semantic data items do not match the previously collected malicious activity information, then performing behavioral analysis on one or more of the non-semantic data items including connecting to a web server identified in the non-semantic data items and analyzing the server information for potentially malicious activity;
   quantifying any potentially malicious non-semantic information with a non-semantic data score for malicious activity;
   analyzing semantic data associated with the incoming email to determine whether the semantic data matches one or more semantic patterns suggestive of a social engineering attack associated with malicious emails;
   quantifying any matched semantic information with a semantic data score for potentially malicious activity; and
   identifying the incoming email as potentially suspect if the non-semantic data score or the semantic data score meets a threshold score for potentially malicious activity.

2. The method of claim 1, wherein determining whether the one or more non-semantic data items match information stored in the data store of previously collected malicious activity information comprises generating a match score that reflects a degree to which the one or more non-semantic data items match malicious activity information stored in the data store of previously collected malicious activity information; and
   wherein identifying the incoming email as potentially suspect comprises comparing the match score with the threshold score.

3. The method of claim 1, wherein performing behavioral analysis on the one or more non-semantic data items comprises generating a behavioral analysis score; and
   wherein identifying the incoming email as potentially suspect comprises comparing the behavioral analysis score with the threshold score.

4. The method of claim 1, wherein analyzing the semantic data comprises generating a pattern score that reflects a degree to which the semantic data matches the one or more patterns; and
   wherein identifying the incoming email as potentially suspect comprises comparing the pattern score with a threshold pattern score.

5. The method of claim 1, further comprising:
   if the incoming email is identified as potentially suspect, extracting identification information from the incoming email and storing the identification information from the incoming email in the data store.

6. The method of claim 5, further comprising:
   performing behavioral analysis on the incoming email to collect additional security information; and
   storing the additional security information in the data store.

7. The method of claim 6, further comprising:
   seeding a collection process with the additional security information, wherein the collection process collects information for entry into the data store.

8. A system for analyzing incoming emails, the system comprising:
   a processor; and
   a memory system comprising one or more computer-readable media configured to store instructions that, when executed by the processor, cause the system to perform the operations of:
   extracting one or more non-semantic data items from an incoming email;
   determining whether one or more of the non-semantic data items match previously collected malicious activity information stored in a data store;
   if the non-semantic data items do not match the previously collected malicious activity information, then performing behavioral analysis on one or more of the non-semantic data items including connecting to a web server identified in the non-semantic data items and analyzing the server information for potentially malicious activity;
   quantifying any potentially malicious non-semantic information with a non-semantic data score for malicious activity;
   analyzing semantic data associated with the incoming email to determine whether the semantic data matches one or more semantic patterns suggestive of a social engineering attack associated with malicious emails;

quantifying any matched semantic information with a semantic data score for potentially malicious activity; and identifying the incoming email as potentially suspect if the non-semantic data score or the semantic data score meets a threshold score for potential malicious activity.

9. The system of claim 8, wherein determining whether the one or more non-semantic data items match information stored in the data store of previously collected malicious activity information comprises generating a match score that reflects a degree to which the one or more non-semantic data items match malicious activity information stored in the data store of previously collected information; and wherein identifying the incoming email as potentially suspect comprises comparing the match score with the threshold score.

10. The system of claim 8, wherein performing behavioral analysis on the one or more non-semantic data items comprises generating a behavioral analysis score; and wherein identifying the incoming email as potentially suspect comprises comparing the behavioral analysis score with the threshold score.

11. The system of claim 8, wherein analyzing the semantic data comprises generating a pattern score that reflects a degree to which the semantic data matches the one or more patterns; and wherein identifying the incoming email as potentially suspect comprises comparing the pattern score with a threshold pattern score.

12. The system of claim 8, wherein the operations further comprise:

when the incoming email is identified as potentially suspect, extracting identification information from the incoming email and storing the identification information from the incoming email in the data store.

13. The system of claim 12, wherein the operations further comprise:

performing behavioral analysis on the incoming email to collect additional security information; and storing the additional security information in the data store.

14. The system of claim 13, wherein the operations further comprise:

seeding a collection process with the additional security information, wherein the collection process collects information for entry into the data store.

15. The computer-implemented method of claim 1, wherein the performing behavioral analysis includes automatically analyzing one or more web pages linked in the incoming email for potential malicious activity.

16. The computer-implemented method of claim 1, further comprising:

categorizing the malicious activity information in the data store into one or more weighted categories according to correlation of the malicious activity information with known malicious activity.

17. The computer-implemented method of claim 16, wherein the quantifying steps include determining the non-semantic score and the semantic score for the incoming email based on one or more of the weighted categories of malicious activity information.

18. The system of claim 8, wherein the performing behavioral analysis includes automatically analyzing one or more web pages linked in the incoming email for potential malicious activity.

19. The system of claim 8, wherein the memory system comprising one or more computer-readable media configured to store instructions that, when executed by the processor, cause the system to perform the operations of categorizing the malicious activity information in the data store into one or more weighted categories according to correlation of the malicious activity information with known malicious activity.

20. The system of claim 8, wherein the quantifying operations include determining the non-semantic score and the semantic score for the incoming email based on one or more of the weighted categories of malicious activity information.

* * * * *